(12) United States Patent
Shabbir et al.

(10) Patent No.: US 10,101,782 B2
(45) Date of Patent: Oct. 16, 2018

(54) SYSTEM AND METHOD FOR THERMAL CONTROL OF AN INFORMATION HANDLING SYSTEM

(71) Applicant: DELL PRODUCTS, L.P., Round Rock, TX (US)

(72) Inventors: Hasnain Shabbir, Round Rock, TX (US); Dinesh Kunnathur Ragupathi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 75 days.

(21) Appl. No.: 15/420,196

(22) Filed: Jan. 31, 2017

(65) Prior Publication Data

US 2017/0139453 A1   May 18, 2017

Related U.S. Application Data

(63) Continuation of application No. 14/048,415, filed on Oct. 8, 2013, now Pat. No. 9,594,568.

(51) Int. Cl.
| | |
|---|---|
| *G06F 1/00* | (2006.01) |
| *G06F 1/20* | (2006.01) |
| *G06F 9/4401* | (2018.01) |

(52) U.S. Cl.
CPC ............ *G06F 1/206* (2013.01); *G06F 9/4401* (2013.01)

(58) Field of Classification Search
CPC .............................. G06F 1/206; G06F 9/4401
USPC .......................................................... 713/100
See application file for complete search history.

(56) References Cited

U.S. PATENT DOCUMENTS

| | | |
|---|---|---|
| 8,532,826 B2 | 9/2013 | Moss et al. |
| 2008/0046765 A1 | 2/2008 | Muraki |

*Primary Examiner* — Austin Hicks
(74) *Attorney, Agent, or Firm* — Isidore PLLC

(57) ABSTRACT

A computer-implemented method enables Basic Input/Output System (BIOS) progress code based thermal control during start-up of an information handling system (IHS). A start-up thermal control sub-system (i) determines an initial cooling level for use during a pre-BIOS progress code operation state of the IHS, (ii) detects each BIOS progress code provided during a boot loading operation of the IHS, and (iii) determines whether a detected BIOS progress code has an associated cooling level requirement that is different from a current cooling level provided by one or more cooling devices of the IHS. In response to the detected BIOS progress code having an associated cooling level requirement that is different from the current cooling level provided by the one or more cooling devices, the one or more cooling devices are triggered to adjust the current cooling level to a next pre-established cooling level associated with the detected BIOS progress code.

20 Claims, 8 Drawing Sheets

| Bios Progress Code 310 | Code Description 320 | Fan Speed (% PWM) 330 |
|---|---|---|
| 1 | System Power On | 50 |
| 2 | CPU Microcode Load | (30 seconds) |
| 3 | Chipset Initialization | |
| 4 | Memory Configuration | 30 |
| 5 | Shadow BIOS | |
| 6 | Multiprocessor Initialization | |
| 7 | POST Processing Start | |
| 8 | SMM Mode Initialization | |
| 9 | PCI Bus & Video Initialization | |
| 0A | BMC Ready | |
| 0B | MBIST Begin | |
| 0C | MBIST Progress 1 | |
| 0D | MBIST Progress 2 | |
| 0E | MBIST End | |
| 40 | Display sign-on | |
| 41 | PCI Configuration | 40 |
| 50 | System F1/F2 wait | |
| 51 | No Bootable Devices | |
| 52 | Entered F2 setup | |
| 53 | Entered F11 | |
| 7F | Give control to O/S | |

260

260

| Bios Progress Code 310 | Code Description 320 | Fan Speed (% PWM) 330 |
|---|---|---|
| 1 | System Power On | 50 |
| 2 | CPU Microcode Load | (30 seconds) |
| 3 | Chipset Initialization | |
| 4 | Memory Configuration | 30 |
| 5 | Shadow BIOS | |
| 6 | Multiprocessor Initialization | |
| 7 | POST Processing Start | |
| 8 | SMM Mode Initialization | |
| 9 | PCI Bus & Video Initialization | |
| 0A | BMC Ready | |
| 0B | MBIST Begin | |
| 0C | MBIST Progress 1 | |
| 0D | MBIST Progress 2 | |
| 0E | MBIST End | |
| 40 | Display sign-on | |
| 41 | PCI Configuration | 40 |
| 50 | System F1/F2 wait | |
| 51 | No Bootable Devices | |
| 52 | Entered F2 setup | |
| 53 | Entered F11 | |
| 7F | Give control to O/S | |

| Bios Progress Code | Code Description | Fan Speed (% PWM) |
|---|---|---|
| 1 | System Power On | 50 |
| 2 | CPU Microcode Load | (30 seconds) |
| 3 | Chipset Initialization | |
| 4 | Memory Configuration | 30 |
| 5 | Shadow BIOS | 20 |
| 6 | Multiprocessor Initialization | |
| 7 | POST Processing Start | |
| 8 | SMM Mode Initialization | |
| 9 | PCI Bus & Video Initialization | |
| 0A | BMC Ready | |
| 0B | MBIST Begin | |
| 0C | MBIST Progress 1 | |
| 0D | MBIST Progress 2 | |
| 0E | MBIST End | |
| 40 | Display sign-on | |
| 41 | PCI Configuration | 60 |
| 50 | System F1/F2 wait | |
| 51 | No Bootable Devices | |
| 52 | Entered F2 setup | |
| 53 | Entered F11 | |
| 7F | Give control to O/S | |
| 00 | Error | 50 |

FIG. 4

SYSTEM AND METHOD FOR THERMAL CONTROL OF AN INFORMATION HANDLING SYSTEM

RELATED APPLICATION

This application is a continuation of and claims priority to U.S. patent application Ser. No. 14/048,415, filed Oct. 8, 2013, the content of which is fully incorporated herein by reference.

BACKGROUND

1. Technical Field

The present disclosure generally relates to thermal control of an information handling system and in particular to enabling Basic Input/Output System (BIOS) progress code based thermal control during start-up of the information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Providing thermal management and cooling to an information handling system is important to prevent overheating and to maintain system reliability. During the initial start-up and boot loading operations of the information handling system, there is a deficiency of cooling system hardware information to allow normal cooling system operations. Some information handling systems that utilize large amounts of system memory can cause significant delays in the time it takes for the boot loading operation to complete. This results in an extended time period before the normal cooling system is operational.

Various methods have been used during early boot loading stages to try to cool an information handling system. For example, the cooling system fan speeds can be set at a fixed speed for only a fixed time duration during start-up operations. This fixed time duration is pre-set and based on a timer. A key problem with this approach is that the variability in boot times are highly configuration dependent. As a result, the information handling system may be over-cooled or under-cooled during this fixed time. One other problem with using a fixed high fan speed is that the system is overcooled and the high fan speeds generate undesirable acoustics in the form of excessive fan noise over the entire start-up operation time period. If the fan speed is set at a fixed low level that has desirable acoustics during the boot loading operation, the system may experience overheating in some components of the information handling system such as high power PCI cards.

BRIEF SUMMARY

Disclosed are a method for controlling and a thermal control system and an information handling system that controls cooling of an information handling system during a boot loading operation of the information handling system.

According to one embodiment, the method comprises detecting, via a start-up thermal control sub-system, each Basic Input/Output System (BIOS) progress code provided during a boot loading operation of the information handling system and determining whether a detected BIOS progress code has an associated cooling level requirement that is different from a current cooling level provided by one or more cooling devices of the information handling system. In response to the detected BIOS progress code having an associated cooling level requirement that is different from the current cooling level provided by the one or more cooling devices, the method includes triggering the one or more cooling devices to adjust the current cooling level to a next pre-established cooling level associated with the detected BIOS progress code.

According to another embodiment, a thermal control system comprises a processor that executes a Basic Input/Output System (BIOS) boot loading operation. A baseboard controller is coupled to the processor via a system interconnect. The baseboard controller has a start-up thermal control sub-system and a cooling device controller. At least one cooling device is coupled to the baseboard controller for cooling one or more system components. The start-up thermal control sub-system has firmware executing thereon to enable thermal control of the system components during system startup and BIOS boot loading operation. The firmware configures the start-up thermal control sub-system to: detect, via the start-up thermal control sub-system, each BIOS progress code provided during the boot loading operation; determine whether a detected BIOS progress code has an associated cooling level requirement that is different from a current cooling level provided by the at least one cooling device; and in response to the detected BIOS progress code having an associated cooling level requirement that is different from the current cooling level provided by the at least one cooling device, trigger the cooling device to adjust the current cooling level to a next pre-established cooling level associated with the detected BIOS progress code.

Also disclosed is an information handling system (IHS) that comprises a processor that executes a Basic Input/Output System (BIOS) boot loading operation. A baseboard controller is coupled to processor via the system interconnect. The baseboard controller has a start-up thermal control sub-system and a cooling device controller. At least one cooling device is coupled to the baseboard controller for cooling functional components of the IHS. The start-up thermal control sub-system has firmware executing thereon to enable thermal control of the information handling system. The firmware configures the start-up thermal control sub-system to: detect, via the start-up thermal control sub-system, each BIOS progress code provided during the boot loading operation of the information handling system; determine whether a detected BIOS progress code has an associated cooling level requirement that is different from a current cooling level provided by the least one cooling device of the information handling system; and in response to the detected BIOS progress code having an associated cooling level requirement that is different from the current cooling level provided by the at least one cooling device, triggering the cooling device to adjust the current cooling level to a next pre-established cooling level associated with the detected BIOS progress code.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 is a schedule illustrating the mapping of BIOS progress codes and corresponding fan speeds, in accordance with one embodiment;

FIG. 4 is another schedule illustrating the mapping of BIOS progress codes and corresponding fan speeds, in accordance with one embodiment;

DETAILED DESCRIPTION

The illustrative embodiments provide a thermal control system; an information handling system (IHS) and a method performed within the information handling system for enabling Basic Input/Output System (BIOS) progress code based thermal control during start-up of the information handling system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
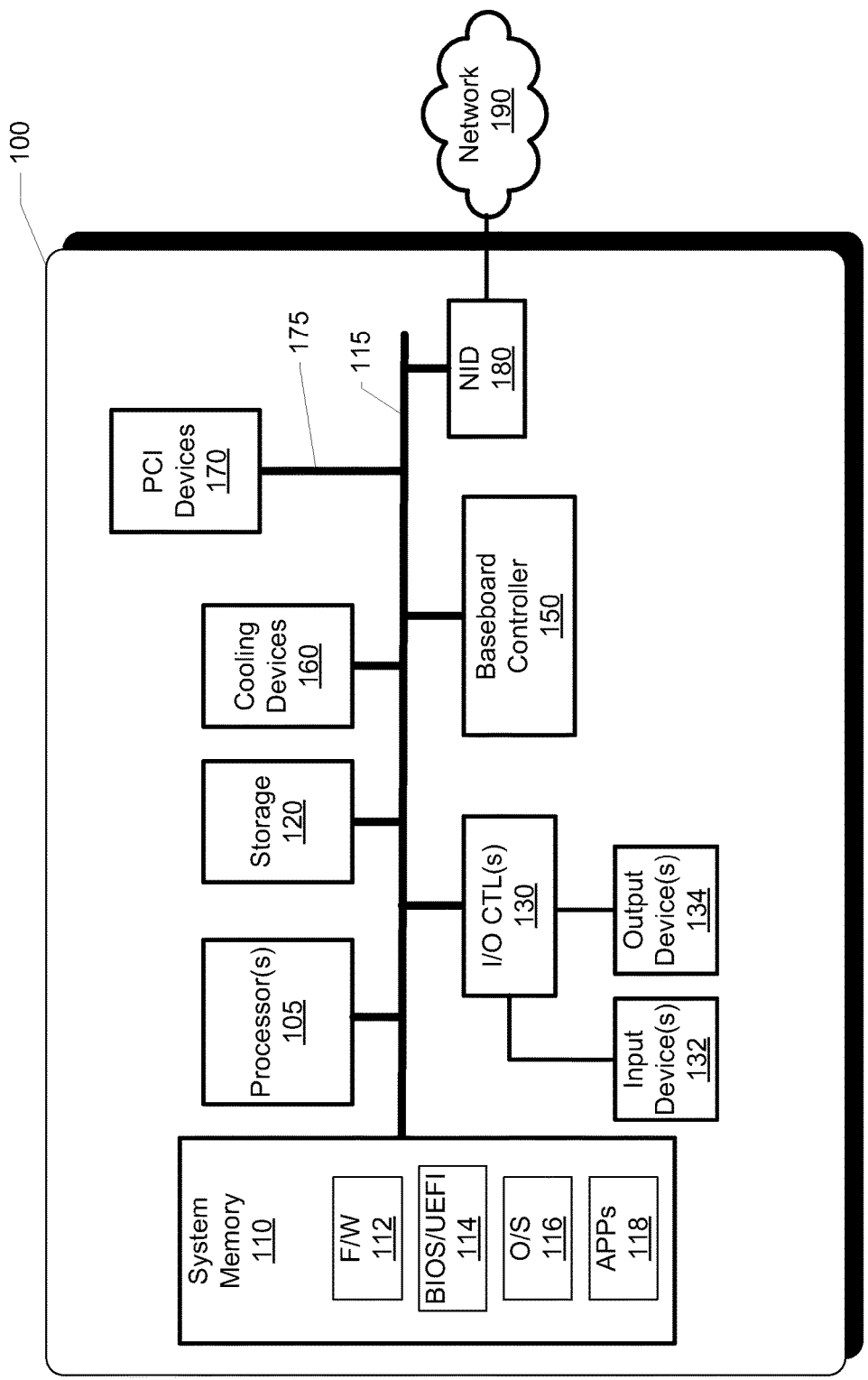
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including firmware (F/W) 112, basic input/output system (BIOS) 114, operating system (O/S) 116, and application(s) 118.

In one or more embodiments, BIOS 114 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

Additionally, in one or more embodiments, IHS 100 includes a baseboard controller 150 and cooling devices 160. Baseboard controller 150 is in communication with processor(s) 105 and system memory 110 via system interconnect 115. Baseboard controller 150 contains components that control specific operations of IHS 100 such as power and thermal management. According to one aspect of the disclosure, baseboard controller 150 also enables Basic Input/Output System (BIOS) progress code based thermal control during start-up of IHS 100. Baseboard controller 150 is in communication with cooling devices 160 via system interconnect 115. Cooling devices 160 can be one or more fans that are positioned to cool IHS 100 during operation. IHS 100 can also include one or more peripheral component interface (PCI) devices 170. When connected within IHS 100, the one or more PCI devices 170 are in communication with other components of IHS 100 via a PCI bus 175 that is coupled to system interconnect 115. In one embodiment, PCI devices 170 can include network printed circuit boards (PCBs), sound PCBs, video PCBs and other PCBs.

IHS 100 further comprises a network interface device (NID) 180. NID 180 enables IHS 100 to communicate and/or interface with other devices, services, and components that are located external to IHS 100. These devices, services, and components can interface with IHS 100 via an external network, such as example network 190, using one or more communication protocols. Network 190 can be a local area network, wide area network, personal area network, and the like, and the connection to and/or between network 190 and IHS 100 can be wired or wireless or a combination thereof. For purposes of discussion, network 190 is indicated as a single collective component for simplicity. However, it is appreciated that network 190 can comprise one or more direct connections to other devices as well as a more complex set of interconnections as can exist within a wide area network, such as the Internet.

Figure 2:
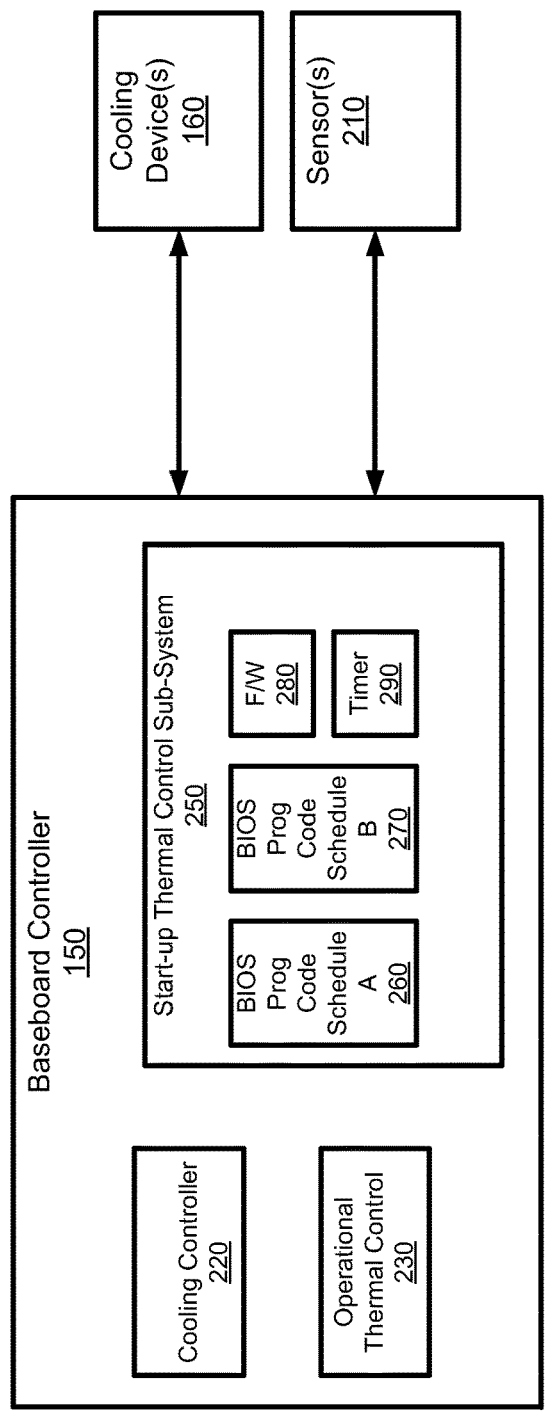
FIG. 2 is a block diagram illustrating components of a baseboard controller and cooling system that support BIOS progress code based thermal control during start-up of the information handling system, in accordance with one embodiment.

With reference now to FIG. 2, there is illustrated one embodiment of baseboard controller 150 that enables and/or implements Basic Input/Output System (BIOS) progress code based thermal control during boot loading operations of IHS 100. Baseboard controller 150 comprises a cooling controller 220, operational thermal control module 230 and start-up thermal control sub-system 250. Cooling controller 220 controls the operation of cooling device(s) 160. Operational thermal control module 230 provides thermal management of IHS 100 during normal operations after the boot loading operation has been completed. Start-up thermal control sub-system 250 provides initial thermal management of IHS 100 during the boot loading operation.

Start-up thermal control sub-system 250 comprises one or more BIOS progress code cooling tables or schedules such as BIOS progress code cooling schedule A 260 and BIOS progress code cooling schedule B 270. BIOS progress code cooling schedules 260 and 270 contain cooling settings or levels for cooling devices 160 that are mapped to or correspond to each of the BIOS progress codes that are posted at the start of each BIOS boot loading operational step. Start-up thermal control sub-system 250 further includes firmware (F/W) 280 and a timer 290. Firmware 280 executes within start-up thermal control sub-system 250 to provide the functionality controlling cooling of IHS 100 during the start-up boot loading operations of IHS 100. Timer 290 can be used to track the amount of time that cooling levels are provided by cooling devices 160.

Baseboard controller 150 is coupled to system interconnect 115 (FIG. 1) in order to communicate with other components of IHS 100. Baseboard controller 150 is also communicatively coupled to cooling devices 160 and one or more sensors 210. In one embodiment, sensors 210 include temperature sensors that provide electrical signals that are proportional to the temperature detected at several locations within IHS 100. Operational thermal control module 230 can use input from sensors 210 to control cooling device(s) 160.

The start-up thermal control sub-system 250 enables BIOS progress code based thermal control during start-up of IHS 100. Firmware 280 executes within start-up thermal control sub-system 250 to detect each BIOS progress code provided during a boot loading operation of IHS 100. Start-up thermal control sub-system 250 determines whether a detected BIOS progress code has an associated cooling level requirement that is different from a current cooling level provided by cooling device(s) 160. In response to the detected BIOS progress code having an associated cooling level requirement that is different from the current cooling level provided by cooling device(s) 160, the start-up thermal control sub-system 250 triggers one or more cooling device(s) 160 to adjust the current cooling level to a next pre-established cooling level associated with the detected BIOS progress code.

Those of ordinary skill in the art will appreciate that the hardware components and basic configuration depicted in FIGS. 1-2 and described herein may vary. For example, the illustrative components within IHS 100 (FIG. 1) and baseboard controller 150 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

FIGS. 3 and 4 illustrate BIOS progress code cooling schedules. The description of FIGS. 3 and 4 is provided with general reference to the specific components illustrated within the preceding FIGS. 1-2. Within each of FIGS. 3 and 4, each BIOS progress code is indicative of and/or represents completion of a specific aspect of the BIOS boot operation. For simplicity, the codes are referred to as corresponding to the specific aspect of the boot operation. Referring to FIG. 3, BIOS progress code cooling schedule A 260 is shown. During a boot loading operation of IHS 100, BIOS/UEFI 114 will report BIOS progress codes 310 at the start of each boot loading operation. BIOS progress code cooling schedule A 260 maps the BIOS progress codes 310 and BIOS progress code descriptions 320 to respective corresponding cooling levels or fan speeds 330 that cooling controller 220 (FIG. 2) supplies to cooling devices 160 (FIG. 1). The cooling levels or fan speeds 330 are percentages of a full pulse width modulation (PWM) signal or duty cycle that cooling controller 220 supplies to cooling device(s) 160. A cooling device 160 operating at 100% would be operating at maximum speed. A cooling device 160 operating at 0% would be turned off.

At BIOS progress code 1, indicating system power on, start-up thermal control sub-system 250 triggers cooling controller 220 to operate cooling device(s) 160 at a 50% fan speed for a fixed time period of 30 seconds. BIOS progress code 2 is CPU microcode load and BIOS progress code 3 is chipset initialization. The cooling device(s) 160 operate at 50% fan speed following receipt or detection of a report indicating the generation of each of BIOS progress codes 1, 2 and 3. In BIOS progress code cooling schedules, BIOS progress code 4 corresponds to memory configuration, BIOS progress code 5 corresponds to shadow BIOS, BIOS progress code 6 corresponds to multiprocessor initialization, BIOS progress code 7 is corresponds to POST processing start, BIOS progress code 8 corresponds to SMM mode initialization, and BIOS progress code 9 corresponds to PCI bus and video initialization. Additionally, BIOS progress code 0A corresponds to BMC ready, BIOS progress code 0B corresponds to MBIST begin, BIOS progress code 0C corresponds to MBIST progress 1, BIOS progress code 0D corresponds to MBIST progress 2, BIOS progress code 0E corresponds to MBIST end, and BIOS progress code 40 corresponds to display sign-on. When BIOS progress code 4 is detected by start-up thermal control sub-system 250, start-up thermal control sub-system 250 triggers cooling controller 220 to operate cooling devices 160 at a 30% fan speed. The cooling device(s) 160 operate at 30% fan speed during BIOS progress codes 4, 5, 6, 7, 8, 9, 0A, 0B, 0C, 0D, 0E and 40.

BIOS progress code 41 corresponds to PCI configuration. When BIOS progress code 41 is detected by start-up thermal control sub-system 250, start-up thermal control sub-system 250 triggers cooling controller 220 to operate cooling device(s) 160 at a 40% fan speed. The cooling device(s) 160 operate at 40% fan speed during detection of BIOS progress codes 41, 50 (system F1/F2 wait), 51 (no bootable devices), 52 (entered F2 setup), 53 (entered F11) and 7F (give control to operating system (O/S) 116). The boot loading operation is completed after BIOS progress code 7F, at which point control is given to O/S 116. At this point, operational thermal control 230 takes over thermal system management of IHS 100 from start-up thermal control sub-system 250 (FIG. 2).

Referring to FIG. 4, BIOS progress code cooling schedule B 270 is shown. BIOS progress code 1 corresponds to system power on. At BIOS progress code 1 system power on, start-up thermal control sub-system 250 triggers cooling controller 220 to operate cooling device(s) 160 at a 50% fan speed for a fixed time period of 30 seconds. BIOS progress code 2 corresponds to CPU microcode load and BIOS progress code 3 corresponds to chipset initialization. The cooling device(s) 160 operate at 50% fan speed following receipt of a report indicating the generation of BIOS progress codes 1, 2, and 3. BIOS progress code 4 corresponds to memory configuration, BIOS progress code 5 corresponds to shadow BIOS, BIOS progress code 6 corresponds to multiprocessor initialization, BIOS progress code 7 corresponds to POST processing start, BIOS progress code 8 corresponds to SMM mode initialization, and BIOS progress code 9 corresponds to PCI bus and video initialization. Additionally, BIOS progress code 0A corresponds to BMC ready, BIOS progress code 0B corresponds to MBIST begin, BIOS progress code 0C corresponds to MBIST progress 1, BIOS progress code 0D corresponds to MBIST progress 2, BIOS progress code 0E corresponds to MBIST end, and BIOS progress code 40 corresponds to display sign-on. When BIOS progress code 4 is detected by start-up thermal control sub-system 250, start-up thermal control sub-system 250 triggers cooling controller 220 to operate cooling devices 160 at a 30% fan speed. When BIOS progress code 5 is detected by start-up thermal control sub-system 250, start-up thermal control sub-system 250 triggers cooling controller 220 to operate cooling devices 160 at 20% fan speed. The cooling devices 160 operate at 20% fan speed during BIOS progress codes 5, 6, 7, 8, 9, 0A, 0B, 0C, 0D, 0E and 40.

When BIOS progress code 41, (PCI configuration) is detected by start-up thermal control sub-system 250, start-up thermal control sub-system 250 triggers cooling controller 220 to operate cooling device(s) 160 at 60% fan speed. The cooling device(s) 160 operate at 60% fan speed during BIOS progress codes 41 (PCI configuration), 50 (system F1/F2 wait), 51 (no bootable devices), 52 (entered F2 setup), 53 (entered F11), and 7F (give control to operating system (O/S) 116. The boot loading operation is completed after BIOS progress code 7F when control is given to O/S 116. At this point, operational thermal control 230 takes over thermal system management of IHS 100 from start-up thermal control sub-system 250.

If an error code 00, which indicates a system problem, is detected by start-up thermal control sub-system 250, start-up thermal control sub-system 250 triggers cooling controller 220 to operate cooling devices 160 at a pre-determined fan speed, such as a 50% cooling level. Error code 00 can be generated by failure of one or more components or processes of IHS 100.

Figure 5:
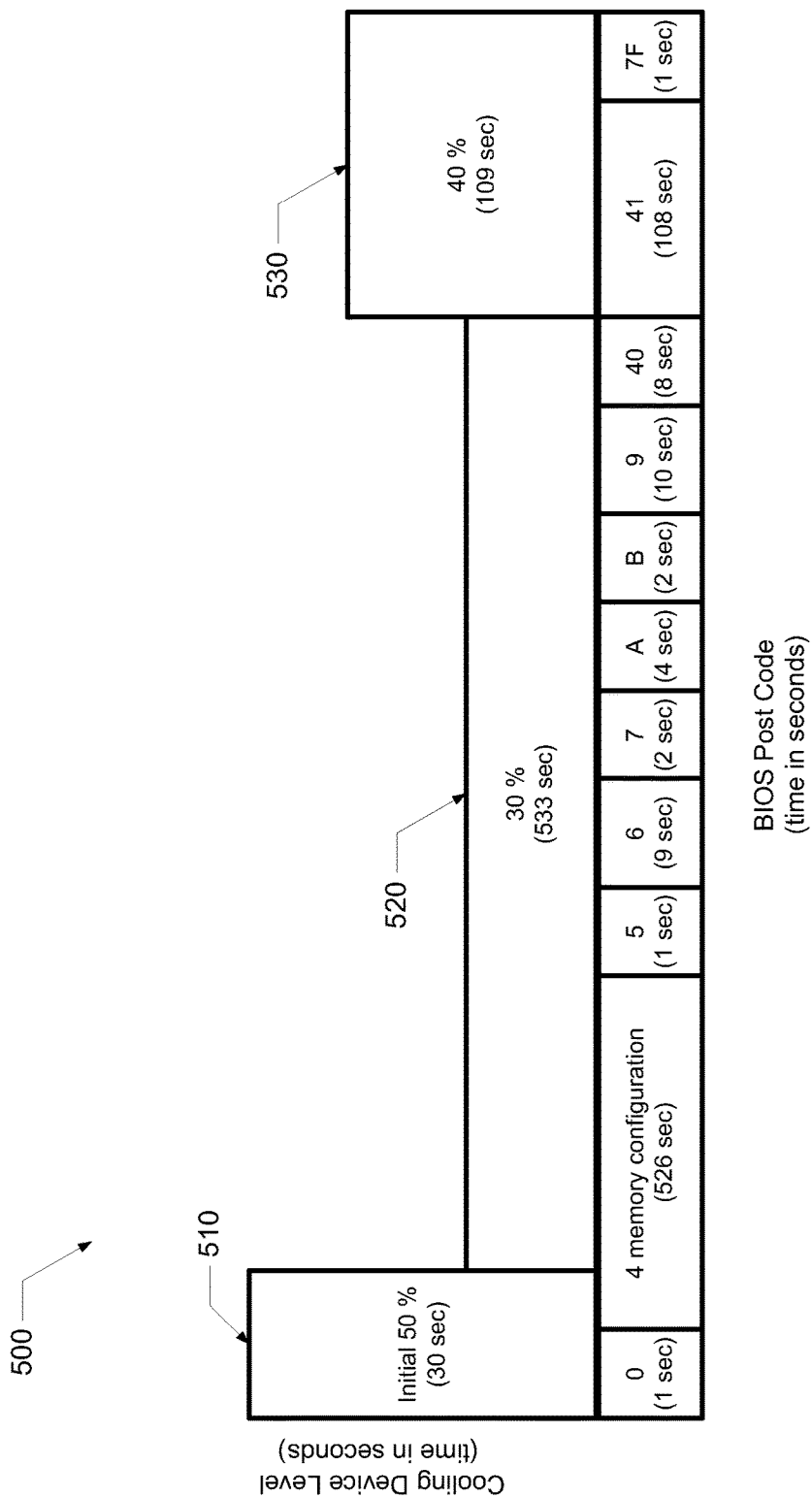
FIG. 5 is a graph of fan speed settings associated with BIOS progress codes during initialization and start-up of an information handling system, in accordance with one embodiment.
Figure 6:
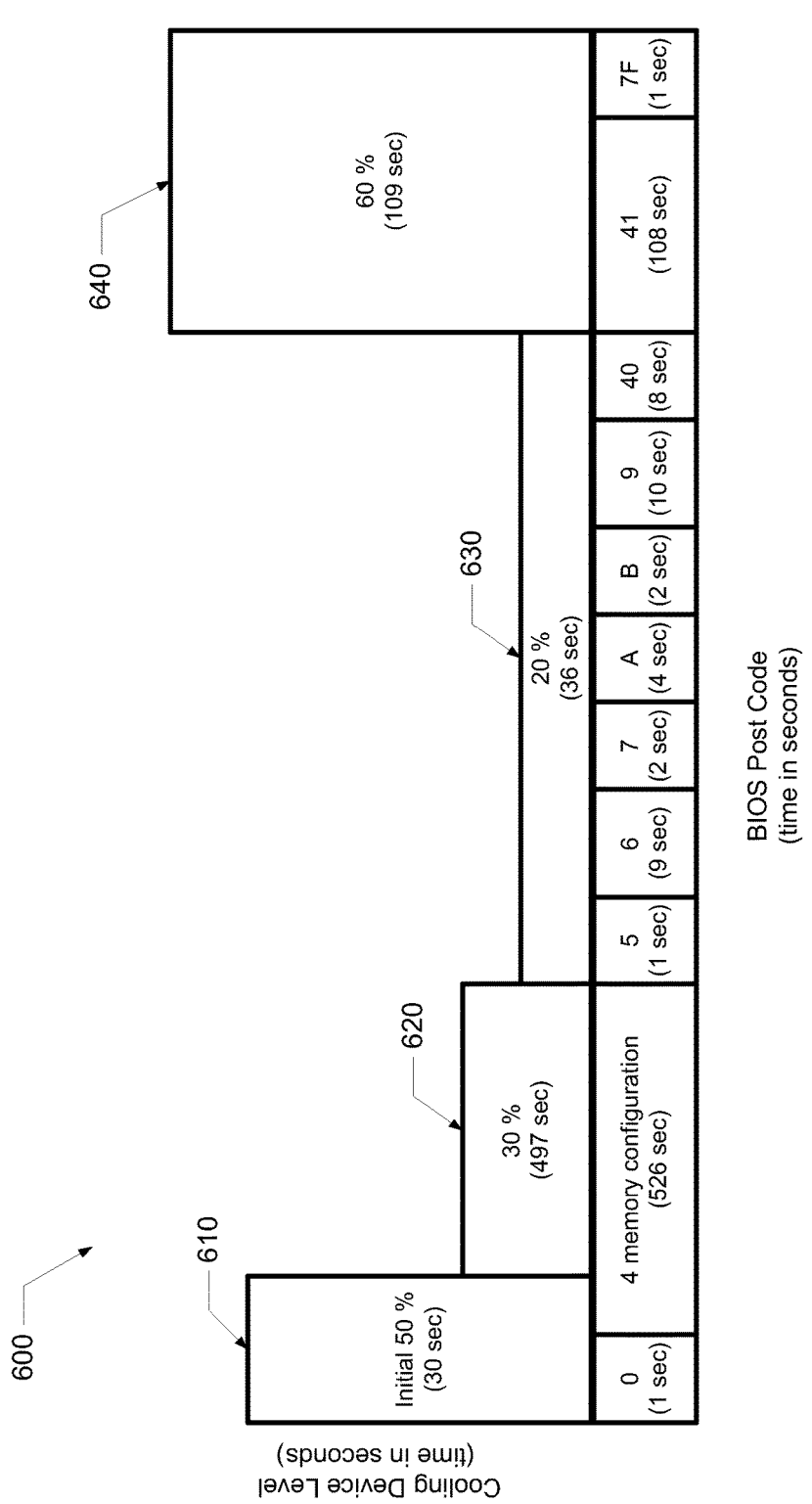
FIG. 6 is an additional graph of fan speed settings associated with BIOS progress codes during initialization and start-up of an information handling system, in accordance with one embodiment.

FIGS. 5 and 6 illustrate graphs of cooling levels associated with BIOS progress codes during initialization and start-up of IHS 100. The description of FIGS. 5 and 6 is provided with general reference to the specific components illustrated within the preceding FIGS. 1-4. Referring to FIG. 5, a graph 500 of cooling levels versus time for BIOS progress code cooling schedule A 260 is shown. At BIOS progress code 0 (system power on), start-up thermal control sub-system 250 triggers cooling controller 220 to operate cooling device(s) 160 at a 50% cooling level 510 for a fixed time period of 30 seconds. The fixed time period of 30 seconds is timed by timer 290 (FIG. 1). The cooling device(s) 160 operate at 50% fan speed until BIOS progress code 4 (memory configuration) occurs. When BIOS progress code 4 is detected by start-up thermal control subsystem 250, start-up thermal control sub-system 250 triggers cooling controller 220 to reduce the cooling level of cooling device(s) 160 to a 30% cooling level 520 for 533 seconds. The cooling device(s) 160 operate at 30% cooling level until BIOS progress code 41 occurs. When BIOS progress code 41 (PCI configuration), is detected by start-up thermal control sub-system 250, start-up thermal control sub-system 250 triggers cooling controller 220 to operate cooling device(s) 160 at a 40% cooling level 530 for 109 seconds. The cooling device(s) 160 operate at 40% cooling level until BIOS progress code 7F is detected. In the illustrative embodiment, BIOS progress code 7F represents the detected code that triggers the turning over of control to O/S 116. At this point, operational thermal control 230 takes over thermal system management of IHS 100 from start-up thermal control sub-system 250.

Referring to FIG. 6, a graph 600 of cooling levels versus time for BIOS progress code cooling schedule A 270 is shown. At BIOS progress code 0 (system power on), start-up thermal control sub-system 250 triggers cooling controller 220 to operate cooling device(s) 160 at a 50% cooling level 610 for a fixed time period of 30 seconds. The fixed time period of 30 seconds is timed by timer 290 (FIG. 2). The cooling device(s) 160 operate at 50% fan speed until BIOS progress code 4 (memory configuration), is generated/reported. When BIOS progress code 4 is detected by start-up thermal control sub-system 250, start-up thermal control sub-system 250 triggers cooling controller 220 to reduce the cooling level of cooling devices 160 to a 30% cooling level 620 for 497 seconds. The cooling device(s) 160 operate at 30% cooling level until BIOS progress code 5 occurs. When BIOS progress code 5 (shadow BIOS) is detected by start-up thermal control sub-system 250, start-up thermal control sub-system 250 triggers cooling controller 220 to operate cooling device(s) 160 at a 20% cooling level 630 for 36 seconds. The cooling devices 160 operate at 20% cooling level until BIOS progress code 41 occurs. When BIOS progress code 41 (PCI configuration) is detected by start-up thermal control sub-system 250, start-up thermal control sub-system 250 triggers cooling controller 220 to operate cooling device(s) 160 at a 60% cooling level 640 for 109 seconds. The cooling device(s) 160 operate at 60% cooling level until the boot loading operation is completed. Completion of the boot loading operation is determined based on receipt or detection of BIOS progress code 7F. Once BIOS progress code 7F is detected, control of system level cooling is given to O/S 116. At this point, operational thermal control 230 takes over thermal system management of IHS 100 from start-up thermal control sub-system 250.

Figure 7:
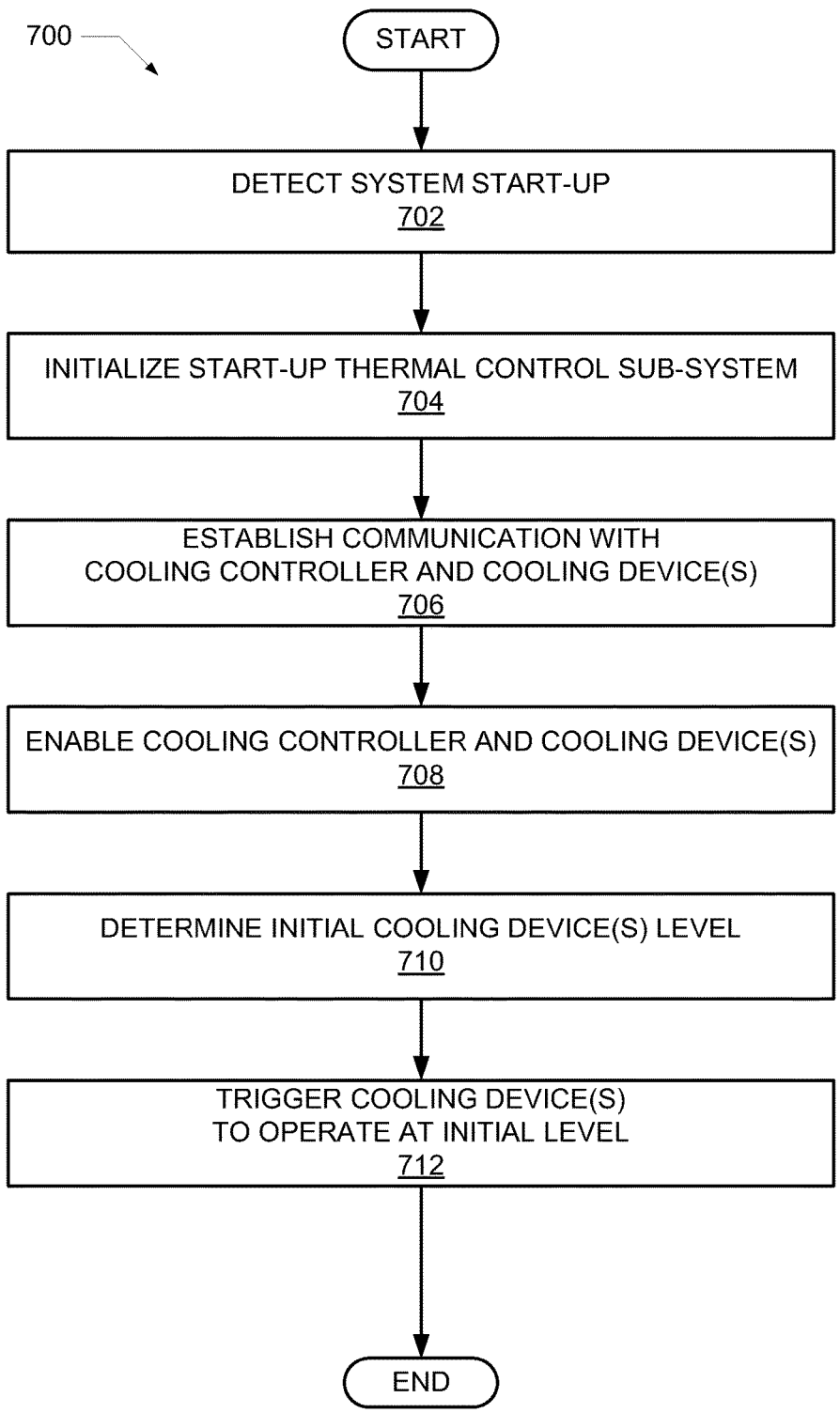
FIG. 7 is a flow chart illustrating one example of the method by which BIOS progress code based thermal control is performed, according to one or more embodiments.
Figure 8:
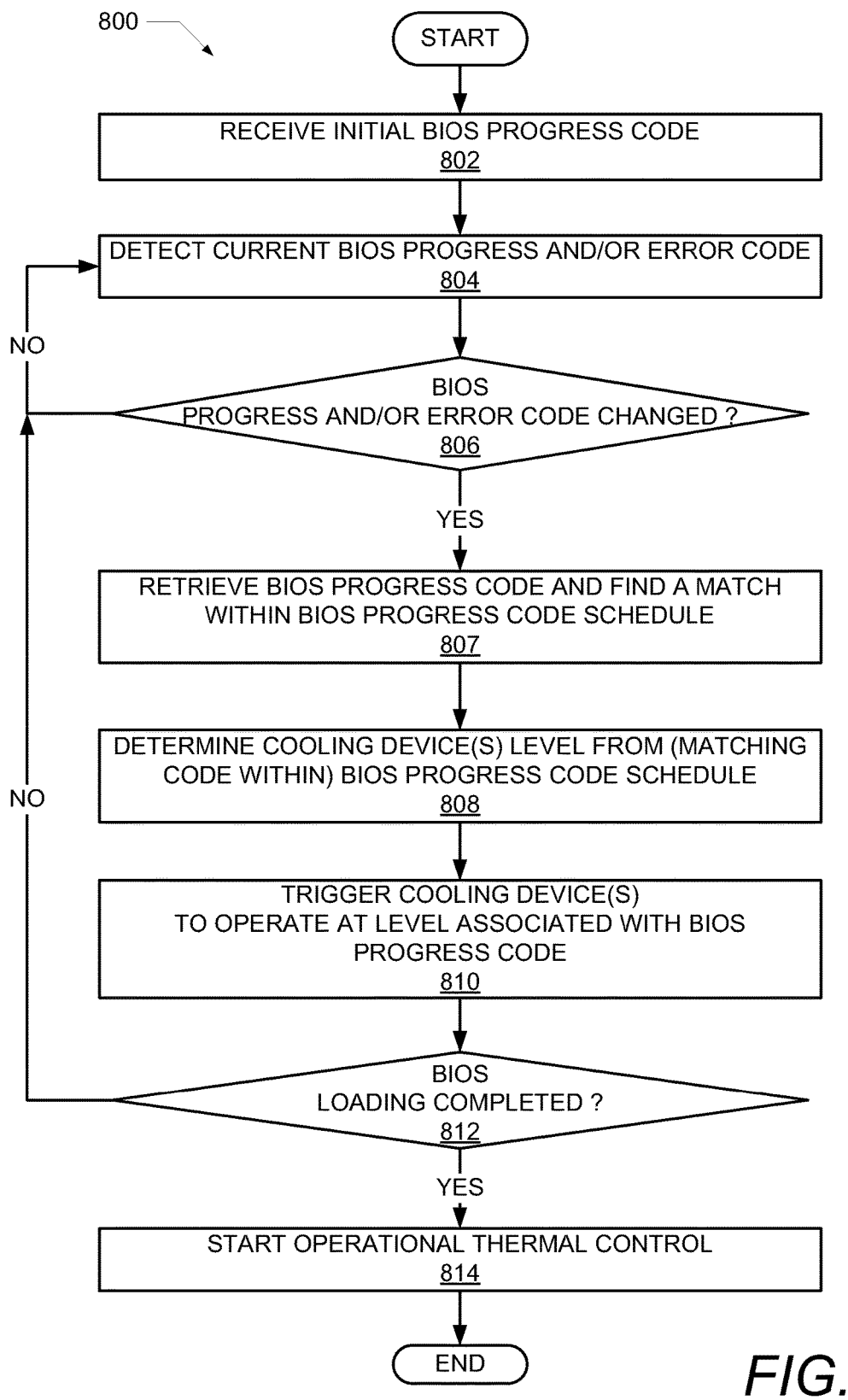
FIG. 8 is a flow chart illustrating one example of the method by which BIOS progress code based thermal control is provided during an initialization and start-up state of the information handling system, according to one or more embodiments.

FIGS. 7 and 8 illustrate flowcharts of exemplary methods by which start-up thermal control sub-system 250 within the preceding figures performs different aspects of the processes that enable the one or more embodiments of the disclosure. Generally, method 700 and method 800 collectively represent computer-implemented methods to enable BIOS progress code based thermal control during the start-up boot loading operations of an information handling system. The description of each method is provided with general reference to the specific components illustrated within the preceding FIGS. 1-6. Generally, each method is described as being implemented via baseboard controller 150 and particularly the execution of code provided by firmware 280 within start-up thermal control sub-system 250 to enable BIOS progress code based thermal control during the start-up boot loading operations of IHS 100. It is however appreciated that certain aspects of the described methods may be implemented via other processing devices and/or execution of other code.

Method 700 illustrates a process for initializing start-up thermal control sub-system 250. Method 700 begins at the start block and proceeds to block 702 where start-up thermal control sub-system 250 detects that IHS 100 has been powered on. At block 704, the start-up thermal control sub-system 250 self-initializes. Initialization of start-up thermal control sub-system 250 includes start-up thermal control sub-system 250 loading at least one of the pre-determined BIOS progress code schedules 260, 270 and enabling timer 290. Start-up thermal control sub-system 250 establishes communication with cooling controller 220 and cooling devices 160 (block 706) and enables operation of cooling controller 220 and cooling device(s) 160 (block 708). Start-up thermal control sub-system 250 determines an initial cooling device level (block 710) for use during a pre BIOS progress code operation and triggers the cooling controller 220 to operate cooling device(s) 160 at the initial cooling level (block 712). In one embodiment, the initial cooling level has a fixed time period (i.e., 30 seconds) that is stored within firmware 280 and timed by timer 290. Method 700 then ends.

Turning now to FIG. 8, a flow chart illustrating an example method 800 to enable BIOS progress code based thermal control during the start-up boot loading operations of an information handling system is shown. Method 800 begins at the start block and proceeds to block 802 where start-up thermal control sub-system 250 receives an initial BIOS progress code (BIOS progress code 1, system power on) from BIOS/UEFI 114. Start-up thermal control sub-system 250 detects the current BIOS progress code and/or generation of an error code from BIOS/UEFI 114 at block 804. Start-up thermal control sub-system 250 determines whether the BIOS progress code and/or error code has changed or is different from the previous BIOS progress code (block 806). The BIOS progress code changes at the start of each new operational step generated by BIOS/UEFI 114.

In response to the BIOS progress code and/or error code not being changed from the previous BIOS progress code, start-up thermal control sub-system 250 continues to detect the current BIOS progress code and/or error code from BIOS/UEFI 114 (block 804). In response to the BIOS progress code and/or error code being changed from the previous BIOS progress code, start-up thermal control sub-system 250 retrieves the new BIOS progress code and compares the new BIOS progress code to codes provided within a pre-determined BIOS progress code schedule 260/270 (block 807). In response to finding a match of the new BIOS progress code within the schedule/s, start-up thermal control sub-system 250 determines a cooling device level that is associated with the BIOS progress code within pre-determined BIOS progress code schedules 260, 270 (block 808). Start-up thermal control sub-system 250 triggers the cooling controller 220 to operate cooling device(s) 160 at the cooling level associated with the current BIOS progress code (block 810).

Start-up thermal control sub-system 250 determines whether the BIOS loading or boot loading operation of BIOS/UEFI 114 has been completed via the detection of BIOS progress code 7F (decision block 812). In response to the BIOS loading operation not being completed, start-up thermal control sub-system 250 continues to detect the current BIOS progress code and/or error code from BIOS/UEFI 114 (block 804). In response to the BIOS loading operation being completed, start-up thermal control subsystem 250 starts operational thermal control module 230 (block 814), such that operational thermal control module 230 takes over thermal system management of IHS 100 from start-up thermal control sub-system 250. Method 800 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method to control cooling of an information handling system during system startup, the method comprising:
 detecting, via a start-up thermal control sub-system, each Basic Input/Output System (BIOS) progress code provided during a boot loading operation of the information handling system;
 in response to detecting start-up of the information handling system, initializing the start-up thermal control sub-system;
 establishing communication between the start-up thermal control sub-system, a cooling device controller and one or more cooling devices;
 determining an initial cooling level for use during a pre-BIOS progress code operation state of the information handling system;
 determining whether a detected BIOS progress code has an associated cooling level requirement that is different from the initial cooling level provided by one or more cooling devices of the information handling system; and
 in response to the detected BIOS progress code having an associated cooling level requirement that is different from the current cooling level provided by the one or more cooling devices, triggering the one or more cooling devices to adjust a current cooling level to a next pre-established cooling level associated with the detected BIOS progress code.

2. The method of claim 1, wherein initializing the start-up thermal control sub-system comprises:
 enabling operation of the cooling device controller and the cooling devices with the initial cooling level; and
 triggering the cooling device controller to operate the cooling device at the initial cooling level.

3. The method of claim 1, further comprising:
 detecting a first BIOS progress code;
 determining whether the first BIOS progress code is different from an initial BIOS progress code within a BIOS progress code cooling schedule;
 in response to the first BIOS progress code being the same as the initial BIOS progress code within the BIOS progress schedule, triggering the one or more cooling devices to provide a first pre-established cooling level; and
 in response to the first BIOS progress code being different than the initial BIOS progress code, identifying and applying a next pre-established cooling level that corresponds to the first BIOS progress code.

4. The method of claim 1, wherein determining whether a detected BIOS progress code has an associated cooling level requirement that is greater than a current cooling level provided by at least one cooling device of the information handling system comprises:
 retrieving a pre-established cooling level corresponding to the detected BIOS progress code from a BIOS progress code data structure comprising a BIOS code cooling schedule.

5. The method of claim 1, further comprising:
 determining whether the detected BIOS progress code has an associated cooling level requirement that is less than the current cooling level provided by the cooling device of the information handling system; and
 in response to the detected BIOS progress code having an associated cooling level requirement that is less than the current cooling level provided by the cooling device, triggering the cooling device to decrease the current cooling level to a next pre-established cooling level associated with the detected BIOS progress code.

6. The method of claim 1, further comprising:
 determining if the boot loading operation has completed; and
 in response to the boot loading operation being completed, triggering the cooling device controller to initiate operational cooling of the information handling system.

7. The method of claim 1, further comprising:
 detecting an error code;
 in response detecting the error code, determining a pre-established cooling level associated with the error code; and
 triggering the cooling device controller to operate the cooling device at the pre-established cooling level associated with the error code.

8. A thermal control system comprising
 a processor that executes a Basic Input/Output System (BIOS) boot loading operation;
 a baseboard controller coupled to the processor via a system interconnect, the baseboard controller having a start-up thermal control sub-system and a cooling device controller;
 at least one cooling device coupled to the baseboard controller for cooling one or more system components;
 the start-up thermal control sub-system having firmware executing thereon to enable thermal control of the system components during system startup and BIOS boot loading operation, wherein the firmware configures the start-up thermal control sub-system to:
 in response to detecting start-up of the information handling system:
  establish communication between the start-up thermal control sub-system, a cooling device controller and one or more cooling devices;
  determine an initial cooling level for use during a pre-BIOS progress code operation state of the information handling system;
  detect, via the start-up thermal control sub-system, each BIOS progress code provided during the boot loading operation;
  determine whether a detected BIOS progress code has an associated cooling level requirement that is different from a current cooling level provided by at least one cooling device; and
  in response to the detected BIOS progress code having an associated cooling level requirement that is different from the current cooling level provided by the at least one cooling device, trigger the cooling device to adjust the current cooling level to a next pre-established cooling level associated with the detected BIOS progress code.

9. The thermal control system of claim 8, wherein the firmware further configures the start-up thermal control sub-system to:
 enable operation of the cooling device controller and the cooling devices with the initial cooling level; and
 trigger the cooling device controller to operate the cooling device at the initial cooling level.

10. The thermal control system of claim 8, wherein the firmware further configures the start-up thermal control sub-system to:
 detect a first BIOS progress code;
 determine whether the first BIOS progress code is different from an initial BIOS progress code within a BIOS progress code cooling schedule;

in response to the first BIOS progress code being the same as the initial BIOS progress code within the BIOS progress schedule, trigger the one or more cooling devices to provide a first pre-established cooling level; and in response to the first BIOS progress code being different than the initial BIOS progress code, identify and apply a next pre-established cooling level that corresponds to the first BIOS progress code.

11. The thermal control system of claim 8, wherein determining whether a detected BIOS progress code has an associated cooling level requirement that is greater than a current cooling level provided by the at least one cooling device comprises the firmware further configuring the start-up thermal control sub-system to:

retrieve a pre-established cooling level corresponding to the detected BIOS progress code from a BIOS progress code data structure comprising a BIOS code cooling schedule.

12. The thermal control system of claim 8, wherein the firmware further configures the start-up thermal control sub-system to:

determine whether the detected BIOS progress code has an associated cooling level requirement that is less than the current cooling level provided by the cooling device of the information handling system; and in response to the detected BIOS progress code having an associated cooling level requirement that is less than the current cooling level provided by the cooling device, trigger the cooling device to decrease the current cooling level to a next pre-established cooling level associated with the detected BIOS progress code.

13. The thermal control system of claim 8, wherein the firmware further configures the start-up thermal control sub-system to:

determine if the boot loading operation has completed; and in response to the boot loading operation being completed, trigger the cooling device controller to initiate operational cooling of the information handling system.

14. The thermal control system of claim 8, wherein the firmware further configures the start-up thermal control sub-system to:

detect an error code;

in response detecting the error code, determine a pre-established cooling level associated with the error code; and trigger the cooling device controller to operate the cooling device at the pre-established cooling level associated with the error code.

15. An information handling system (IHS) comprising:

a processor that executes a Basic Input/Output System (BIOS) boot loading operation;

a memory coupled to the processor via a system interconnect;

a baseboard controller coupled to processor via the system interconnect, the baseboard controller having a start-up thermal control sub-system and a cooling device controller;

at least one cooling device coupled to the baseboard controller for cooling functional components of the IHS;

the start-up thermal control sub-system having firmware executing thereon to enable thermal control of the information handling system, wherein the firmware configures the start-up thermal control sub-system to:

in response to detecting start-up of the information handling system:

establish communication between the start-up thermal control sub-system, a cooling device controller and one or more cooling devices;

determine an initial cooling level for use during a pre-BIOS progress code operation state of the information handling system;

detect, via the start-up thermal control sub-system, each BIOS progress code provided during the boot loading operation;

determine whether a detected BIOS progress code has an associated cooling level requirement that is different from a current cooling level provided by at least one cooling device; and in response to the detected BIOS progress code having an associated cooling level requirement that is different from the current cooling level provided by the at least one cooling device, trigger the cooling device to adjust the current cooling level to a next pre-established cooling level associated with the detected BIOS progress code.

16. The information handling system of claim 15, wherein the firmware further configures the start-up thermal control sub-system to:

detect a first BIOS progress code;

determine whether the first BIOS progress code is different from an initial BIOS progress code within a BIOS progress code cooling schedule;

in response to the first BIOS progress code being the same as the initial BIOS progress code within the BIOS progress schedule, trigger the one or more cooling devices to provide a first pre-established cooling level; and in response to the first BIOS progress code being different than the initial BIOS progress code, identify and apply a next pre-established cooling level that corresponds to the first BIOS progress code.

17. The information handling system of claim 15, wherein determining whether a detected BIOS progress code has an associated cooling level requirement that is greater than a current cooling level provided by the least one cooling device causes the firmware to further configure the start-up thermal control sub-system to:

retrieve a pre-established cooling level corresponding to the detected BIOS progress code from a BIOS progress code data structure comprising a BIOS code cooling schedule.

18. The information handling system of claim 15, wherein the firmware further configures the start-up thermal control sub-system to:

determine whether the detected BIOS progress code has an associated cooling level requirement that is less than the current cooling level provided by the cooling device of the information handling system; and in response to the detected BIOS progress code having an associated cooling level requirement that is less than the current cooling level provided by the cooling device, trigger the cooling device to decrease the current cooling level to a next pre-established cooling level associated with the detected BIOS progress code.

19. The information handling system of claim 15, wherein the firmware further configures the start-up thermal control sub-system to:

determine if the boot loading operation has completed; and in response to the boot loading operation being completed, trigger the cooling device controller to initiate operational cooling of the information handling system.

20. The information handling system of claim 15, wherein the firmware further configures the start-up thermal control sub-system to:
   detect an error code;
   in response detecting the error code, determine a pre-established cooling level associated with the error code; and
   trigger the cooling device controller to operate the cooling device at the pre-established cooling level associated with the error code.

* * * * *